Figure 1:
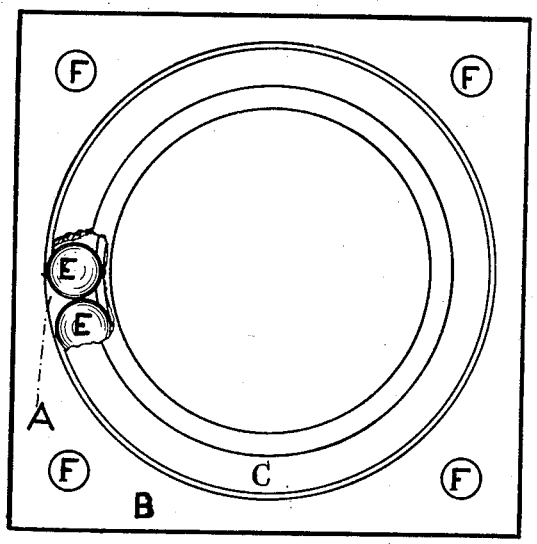

O. C. KNIPE.
METHOD OF MAKING BALL BEARINGS.
APPLICATION FILED DEC. 14, 1910.

1,006,103.

Patented Oct. 17, 1911.

WITNESSES

INVENTOR

UNITED STATES PATENT OFFICE.

OLIVER C. KNIPE, OF WASHINGTON, DISTRICT OF COLUMBIA.

METHOD OF MAKING BALL-BEARINGS.

1,006,103.   Specification of Letters Patent.   Patented Oct. 17, 1911.

Original application filed December 20, 1909, Serial No. 534,207. Divided and this application filed December 14, 1910. Serial No. 597,207.

*To all whom it may concern:*

Be it known that I, OLIVER C. KNIPE, a citizen of the United States, residing at 526 Columbia road northwest, in the District of Columbia, have invented certain new and useful Improvements in Methods of Making Ball-Bearings, of which the following is a specification.

This invention relates to that class of ball-retaining bearings in which the balls are retained in the annular cup or raceway when the shaft is removed from the bearing. This is usually accomplished by having a cup or raceway for the balls an inner flanged shell or cone to fit the shaft and a third member attached to the cone or cup and of such design that it will allow independent rotation of the cup and cone but prevent displacement of the balls. The defect of all these devices is that they are liable to accidental displacement making them not only unreliable but objectionable where assembling or repairing must be done by unskilled workmen.

Applicant's device differs from these by supplying a complete bearing in which the third member is dispensed with entirely when the bearing is completed; it also contains other novel features not heretofore disclosed in ball bearings, and which are fully brought forth in the description and claims.

The present application is a division of my application No. 534,207, filed December 20th, 1909.

I provide an annular cup in which the balls rotate and an inner sleeve having outwardly flanged ends and of such relative diameter that the cylindrical portion passes through the center opening in the ball cup but the flange diameters are made larger than the opening in the ball cup. The sleeve is made of sufficient length to admit of rotation without binding on the cup when the bearing is completed thus it will be seen that it is impossible after the bearing is assembled to remove either the balls or sleeve from the cup.

The cup and cone are preferably formed of sheet steel and then case-hardened; the cone or sleeve being stamped in two cylindrical pieces each having one end conically flanged outwardly and the cylindrical ends beveled off about one half of their sectional areas. The balls are placed in the cup, one part of the sleeve or cone is placed in the cup, and the small end of the second part of the sleeve or cone is brought in contact with the small end of the first part and a local heat is applied (by means of an electric current or some form of autogenous gas flame) at the abutted edges, instantly welding the two parts together without injury to the case-hardened surfaces of the body of the sleeve. The reduced cross-sectional area of the abutting edges of the parts of the sleeve or cone causes them to heat rapidly, and the edges fuse before the heat carries back to the body of the sleeve sufficiently to injure the case-hardening; when heated to the fusing point a slight pressure on the parts unites the same firmly. This construction forms a strong, durable bearing that can be made at a low cost rapidly and produces a product superior to any now on the market.

The cup is preferably made with an outwardly projecting flange B having a plurality of holes F in its margin, through which retaining bolts or screws may be inserted. A plurality of holes F in the rim serve for the insertion of anchoring bolts or screws. The flange B also serves to support the bearing where it is desired to aline a shaft in position and run melted Babbitt or similar metal around the bearing while temporarily so held; the perforations F in the rim also serve to hold the bearing in alinement by the flow of the metal filling them up.

Figure 2:
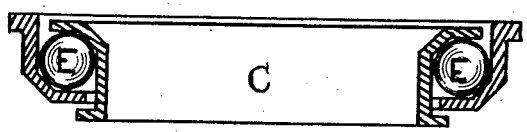
Figure 3:
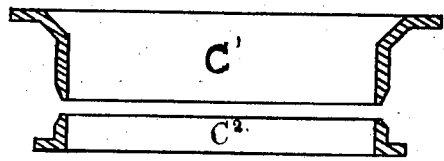

In the drawings Figure 1 is a top view of the bearing complete with a portion of the sleeve or cone broken away. Fig. 2. is a vertical section through Fig. 1. Fig. 3 is a vertical section through the sleeve or cone showing the parts C' and C² prepared for welding.

The cup A with its flange B and perforations F and the two parts of the sleeve or cone C' and C² are rapidly produced in a drawing or stamping press complete ready for case-hardening.

The parts are assembled and held in position between the clamps of a welding machine such as the Thomson electric welder. The beveled edges of the parts of the cone held in contact by the clamps instantly fuse when the electric current is turned on, and a slight pressure on the adjustable clamps completes the weld before the heat travels back far enough to injure the case-hardened surfaces of the body of the sleeve or cone. The parts of the cone are made of sufficient length to admit of free rotation after welding.

The invention is applicable to many other structures than ball bearings, in fact to any use in which metal parts must be molecularly and integrally united without destroying the molecular or physical condition of the parts adjacent to the line of a weld.

Having thus described my invention, what I claim as new and desire to secure by Letters Patent is:—

1. The method of welding one body of metal to another body of metal consisting in bringing the parts into contact along an extended edge creating an instantaneous welding heat transversely through the joint, and exerting a slight pressure on the abutting edges, whereby the weld is effected, before the adjacent parts are changed in their molecular or physical condition.

2. The method of welding one body of hardened metal to another body of metal consisting in bringing the parts into contact along an extended edge creating an instantaneous welding heat by applying an electric current transversely through the joint, and applying a slight pressure on the abutting edges, whereby union is effected so quickly that the hardness is not reduced in adjacent parts.

3. The method of welding two hardened steel bodies together consisting in bringing them into contact passing transversely through the junction an electric current or amperage to instantaneously make a welding heat, and forcing the edges together with light pressure, whereby the weld is completed before the parts adjacent to the weld have been heated sufficiently to lose their hardness.

4. The method of welding together hardened steel parts consisting in providing the parts at their abutting edges with a reduced section and bringing them under a slight pressure while passing through them a current sufficient to bring the edges instantaneously to a welding heat.

In testimony whereof I have hereunto subscribed my name this 14th day of December A. D. 1910.

OLIVER C. KNIPE.

Witnesses:
 THOMAS DURANT,
 HALBERT P. BROWN.